United States Patent
Lederer et al.

(10) Patent No.: US 8,751,079 B2
(45) Date of Patent: Jun. 10, 2014

(54) METHOD AND DEVICE FOR CONTROLLING A BATTERY PULSE HEATING MODE OF A TRACTION BATTERY OF A HYBRID VEHICLE

(75) Inventors: Matthias Lederer, Renningen-Malmsheim (DE); Martin Roth, Rutesheim (DE); Marco Fleckner, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 225 days.

(21) Appl. No.: 13/091,200

(22) Filed: Apr. 21, 2011

(65) Prior Publication Data
US 2011/0282531 A1    Nov. 17, 2011

(30) Foreign Application Priority Data
May 15, 2010    (DE) .......................... 10 2010 020 683

(51) Int. Cl.
  *B60L 9/00*    (2006.01)
  *G06F 19/00*   (2011.01)
  *B60W 10/24*   (2006.01)
  *B60L 1/02*    (2006.01)

(52) U.S. Cl.
  USPC ............. 701/22; 701/101; 701/113; 903/902; 903/903; 180/65.29; 219/205

(58) Field of Classification Search
  USPC .................... 701/22, 101–116; 903/902, 903; 180/65.29; 219/205
  See application file for complete search history.

(56) References Cited

U.S. PATENT DOCUMENTS

| | | | |
|---|---|---|---|
| 6,271,648 B1 | 8/2001 | Miller | |
| 6,649,290 B2 * | 11/2003 | Leboe et al. | 429/423 |
| 7,317,985 B2 * | 1/2008 | Suzuki | 701/113 |
| 2007/0292724 A1 * | 12/2007 | Gilchrist | 429/9 |
| 2008/0284378 A1 * | 11/2008 | Birke et al. | 320/149 |
| 2010/0140246 A1 * | 6/2010 | Grider et al. | 219/205 |
| 2010/0212981 A1 * | 8/2010 | Roos et al. | 180/65.275 |
| 2011/0047981 A1 * | 3/2011 | Roos et al. | 60/286 |
| 2011/0288708 A1 * | 11/2011 | Katono et al. | 701/22 |

FOREIGN PATENT DOCUMENTS

| | | |
|---|---|---|
| JP | 2002-343401 | 11/2002 |
| JP | 2007-97359 | 4/2007 |
| JP | 2008-162318 | 7/2008 |

* cited by examiner

*Primary Examiner* — Muhammad Shafi
*Assistant Examiner* — Majdi Alsomiri
(74) *Attorney, Agent, or Firm* — Gerald E. Hespos; Michael J. Porco; Matthew T. Hespos

(57) ABSTRACT

A method and a device are provided for controlling a battery pulse heating mode of a traction battery of a hybrid vehicle. The method includes detecting a traction battery temperature (T) upon start-up of the hybrid vehicle. The method then includes determining a dependency of fuel consumption (V) during a battery pulse heating mode on the distance (W) travelled for at least one predefined road type at the detected traction battery temperature (T). The method continues by displaying the determined dependency on a display device (50), using an input device (60) to select whether a battery pulse heating mode should be carried out; and controlling the battery pulse heating mode as a function of the selection.

10 Claims, 5 Drawing Sheets

METHOD AND DEVICE FOR CONTROLLING A BATTERY PULSE HEATING MODE OF A TRACTION BATTERY OF A HYBRID VEHICLE

CROSS REFERENCE TO RELATED APPLICATION

This application claims priority under 35 USC 119 to German Patent Application No 10 2010 020 683.0 filed on May 15, 2010, the entire disclosure of which is incorporated herein by reference.

BACKGROUND OF THE INVENTION

1. Field of the Invention

The invention relates to a method and a device for controlling a battery pulse heating mode of a traction battery of a hybrid vehicle.

2. Description of the Related Art

The traction battery (for example NiMH or Li-ion technology) of a hybrid vehicle often cannot provide sufficient electrical current for the hybrid functions at low temperatures. More particularly, the maximum admissible electrical current limits for charging and discharging are a function of the temperature of the traction battery. Thus, the hybrid functions are restricted at low accumulator temperatures or electric driving is available only beyond a certain temperature threshold, for example above 10° C. Accordingly, the fuel saving capability of the hybrid system is reduced at low temperatures.

To solve this problem, the traction battery is heated to its optimum operating temperature as quickly as possible to ensure the optimum availability of the hybrid functions. An air-cooled traction battery can be heated only by its own losses during charging and discharging. Heating-up during driving necessitates a battery pulse heating mode where charging and discharging occur within the temperature-dependent electrical current limits.

The battery pulse heating mode is implemented with the internal combustion engine being assisted by the electric machine during driving for discharging, and being acted on by the electric machine with a load point increase for charging. However, these purposely generated power losses for heating the traction battery require additional fuel so that over short driving distances the average fuel consumption is considerably higher with the battery pulse heating mode than without.

FIG. 5 shows dependencies of the additional fuel consumption $\Delta V$ during a battery pulse heating mode on the distance W travelled for different traction battery temperatures T=−10, −5, 0, +5° C.

In FIG. 5, curve A denotes a traction battery temperature T=−10° C., curve B denotes a traction battery temperature T=−5° C., curve C denotes a traction battery temperature T=0° C., and curve D denotes a traction battery temperature T=5° C. As can be seen from FIG. 5, the additional consumption is significantly higher at a relatively low battery temperature than at a relatively high traction battery temperature. In other words, at relatively low traction battery temperatures, a greater distance must be travelled to arrive at a correspondingly reduced level of additional consumption.

For simplicity, it is assumed in the illustration of FIG. 5 that the battery pulsing takes place at infinite speed, which is of course not the case in reality, but can be assumed here for simplification of the illustration.

U.S. Pat. No. 6,271,648 B1 discloses a method for conditioning a battery to improve the cold-start behavior of a vehicle. The method uses the electric starter to carry out a battery pulse heating mode at cold temperatures, before the vehicle is started.

JP 2007097359 A discloses a device for controlling a battery pulse heating mode, wherein a navigation destination is taken into consideration for the decision as to whether the battery pulse heating mode is carried out.

JP 2008162318 A discloses a method for controlling a battery pulse heating mode on the basis of a route identification.

It is an object of the present invention to provide a more flexible method for controlling a battery pulse heating mode of a traction battery of a hybrid vehicle, and a corresponding device.

SUMMARY OF THE INVENTION

The invention is based on informing the driver of the dependency of the fuel consumption on the distance and road type and enabling the driver to make a decision as to whether a fuel consumption advantage can be obtained in the impending journey by means of a battery pulse heating mode.

The invention indicates to the driver that, if the impending journey covers an adequate distance on the designated road type, the battery pulse heating mode enables the hybrid functions to be provided to their full extent so that an optimum fuel consumption saving can be realized by the hybrid functions. In this case, the additional consumption resulting from the battery pulse heating mode is overcompensated by the hybrid functions.

For example, the driver may be informed that the hybrid functions are not available when the vehicle is started up with the key due to prevailing low temperatures of the traction battery. The driver then may make a selection as to whether he wishes to activate the battery pulse heating mode, wherein information is provided to him on a display device as to the distance beyond which a fuel consumption advantage can be obtained again.

This query has the advantage that short journeys are not automatically afflicted with the additional fuel consumption arising from the battery pulse heating mode.

The dependencies of the fuel consumption during a battery pulse heating mode preferably are determined on the distance travelled for a plurality of predefined road types at the detected traction battery temperature.

A location of the hybrid vehicle preferably is established, and only dependencies that are preselected on the basis of the established location are determined and/or displayed. This increases clarity for the driver.

The road type may be determined as being one of a motorway, country road or city traffic.

DETAILED DESCRIPTION OF THE PREFERRED EMBODIMENTS

In the figures, the same reference signs are used to denote identical or functionally identical components.

Figure 1:
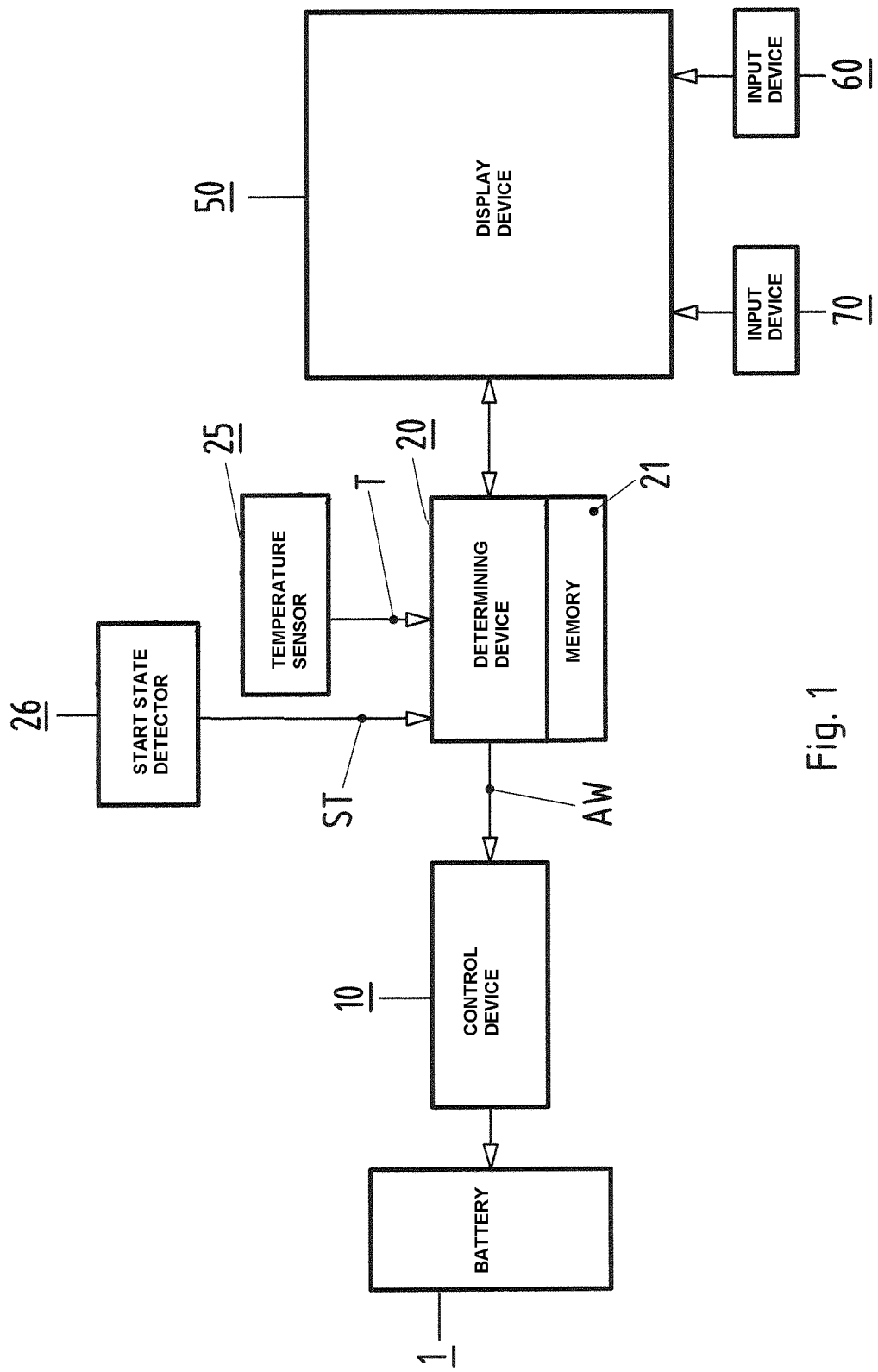
FIG. 1 is a schematic illustration of a first embodiment of the device according to the invention for controlling a battery pulse heating mode of a traction battery of a hybrid vehicle.

FIG. 1 is a schematic illustration of a first embodiment of the device for controlling a battery pulse heating mode of a traction battery of a hybrid vehicle. The reference numeral 1 in FIG. 1 denotes a traction battery of a hybrid vehicle. A battery pulse heating mode of the traction battery 1 is controlled by a control device 10.

A determining device 20 is provided for determining a dependency of fuel consumption of the hybrid vehicle during a battery pulse heating mode on the distance travelled for predefined road types. For this purpose, the determining device 20 uses look-up tables stored in a memory device 21 as a function of the temperature T of the traction battery.

A temperature sensor 25 detects the current temperature T of the traction battery 1 provides the current temperature T to the determining device 20. The determining device 20 then can extract the look-up tables for the corresponding temperature T from the memory device 21.

A start state detector 26 detects a start state ST of the hybrid vehicle and transmits an appropriate start state ST signal to the determining device 20.

The dependencies of the fuel consumption during a battery pulse heating mode on the distance travelled for the predefined road types, for example motorway, country road and city traffic, at the detected temperature T of the traction battery 1 are displayed to the driver on a display device 50 if a start state ST is present and further possible conditions are met. The display device 50 may for example be a combination instrument or the screen of a navigation system.

Figure 2:
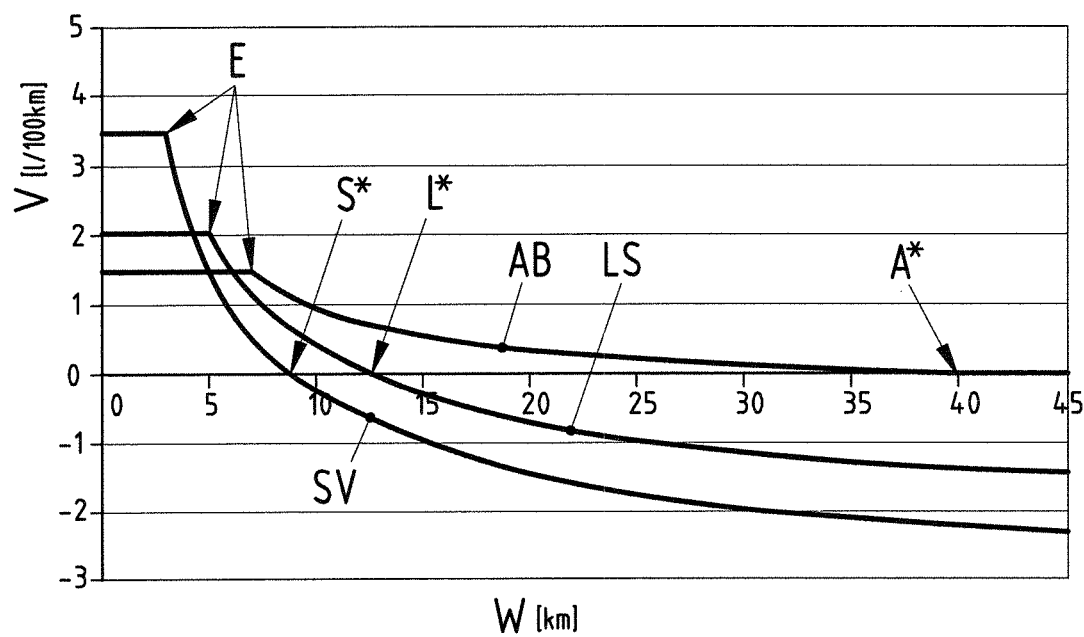
FIG. 2 is an exemplary illustration of determined dependencies of the fuel consumption V during a battery pulse heating mode on the distance W travelled for the road types motorway, country road, city driving at a detected traction battery temperature T=10° C.

FIG. 2 is an exemplary illustration of determined dependencies of the fuel consumption V during a battery pulse heating mode on the distance W travelled for the road types motorway AB, country road LS and city driving SV at a detected traction battery temperature T=10° C.

The three curves AB, LS and SV begin initially horizontally and run in this way to a point E at which the battery pulse heating mode is stopped and the hybrid functions are enabled. Up to the point E, the respective additional fuel consumption as a result of the battery pulse heating mode is constant and, in the present example, is approximately 1.5 l/100 km for the curve AB, approximately 2 l/100 km for the curve LS, and approximately 3.5 l/100 km for the curve SV.

The additional fuel consumption falls when the hybrid functions are enabled because a part of the drive can be provided by the electric machine.

Activation of the battery pulse heating mode is worthwhile for city traffic at the point S* for the curve SV, which is after approximately 8 km distance W.

Activation of the battery pulse heating mode is worthwhile for the country road at the point L* for the curve LS, which is after a distance W of approximately 13 km.

Activation of the battery pulse heating mode is worthwhile for the motorway at the point A*, which is after approximately 40 km distance W.

It is therefore possible for the driver, on the basis of the dependencies presented on the display device 50 and with the knowledge of his own planned route, to decide whether he wishes to select or activate the battery pulse heating mode.

Selection for activation is carried out by an input device 60, for example a touch screen field. Alternatively, a corresponding negative input is given at the input device 60.

The control of the battery pulse heating mode of the traction battery 1 is carried out according to the selection by the driver, which is transmitted to the determining device 20 and as a selection signal AW to the control device 10, as shown in FIG. 1.

FIG. 1 shows a further input device 70 at which the selection or non-selection of the battery pulse heating mode can be corrected or cancelled at any time.

Figure 3:
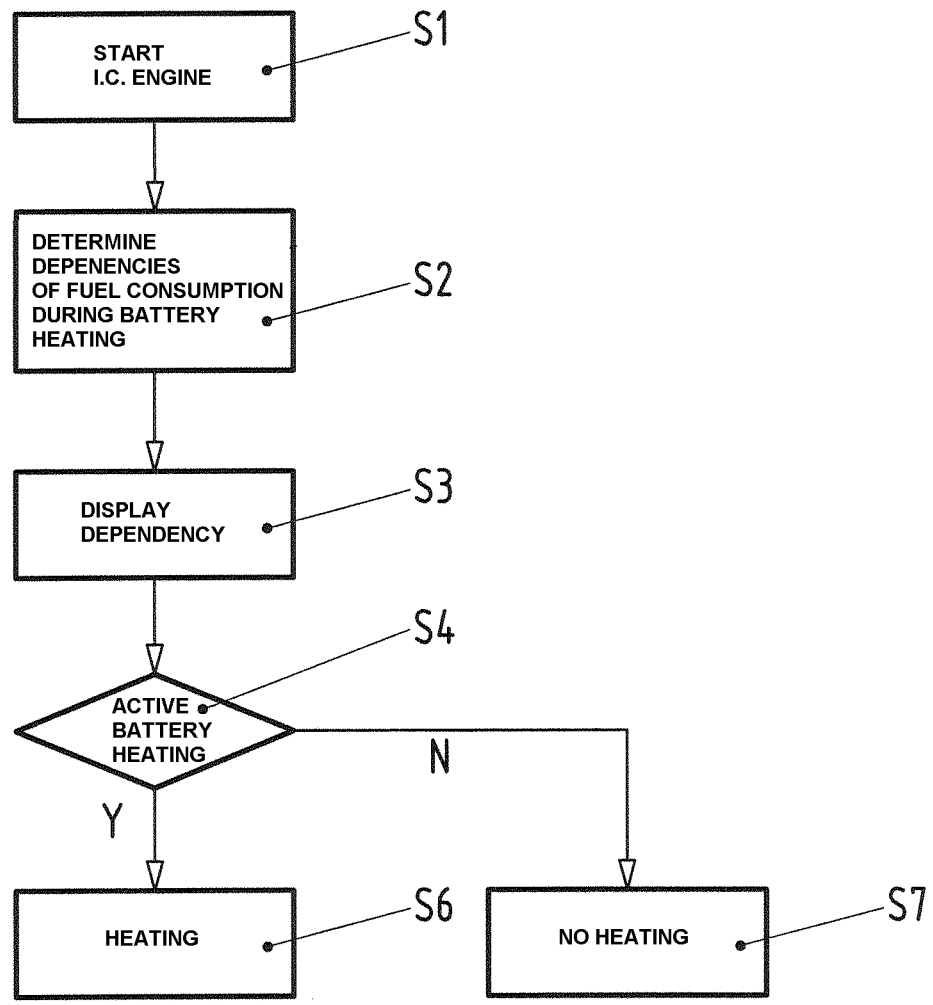
FIG. 3 is a flow diagram for explaining an embodiment of the method of the invention for controlling a battery pulse heating mode of a traction battery of a hybrid vehicle.

FIG. 3 is a flow diagram for explaining an embodiment of the method according to the invention for controlling a battery pulse heating mode of a traction battery of a hybrid vehicle.

The method illustrated in FIG. 3 for controlling a battery pulse heating mode by the device of FIG. 1 begins at the step S1, in which the internal combustion engine of the hybrid vehicle is started by the driver. This starting is detected by the start state detector 26, which transmits a start state ST signal to the determining device 20.

In step S2, the determining device 20 determines the dependencies of the fuel consumption during a battery pulse heating mode on the distance travelled for the road types motorway AB, country road LS and city traffic SV, and causes said dependencies, together with a corresponding selection menu, to be displayed to the driver on the display device 50 in step S3. The selection menu may for example read: Should the battery pulse heating mode be activated [Y/N].

If the driver wishes to activate the battery pulse heating mode for the intended route, he gives a corresponding input at the input device 60 in step S4, such that in step S6, a positive selection signal AW is transmitted to the control device 10 to trigger battery pulsing.

In the negative situation, that is to say if, in view of the intended route, no battery pulse heating mode should be carried out, the driver gives a corresponding negative input at the input device 60 in step S7, such that a corresponding negative selection signal AW is transmitted to the control device 10, and no battery pulse heating mode takes place.

Figure 4:
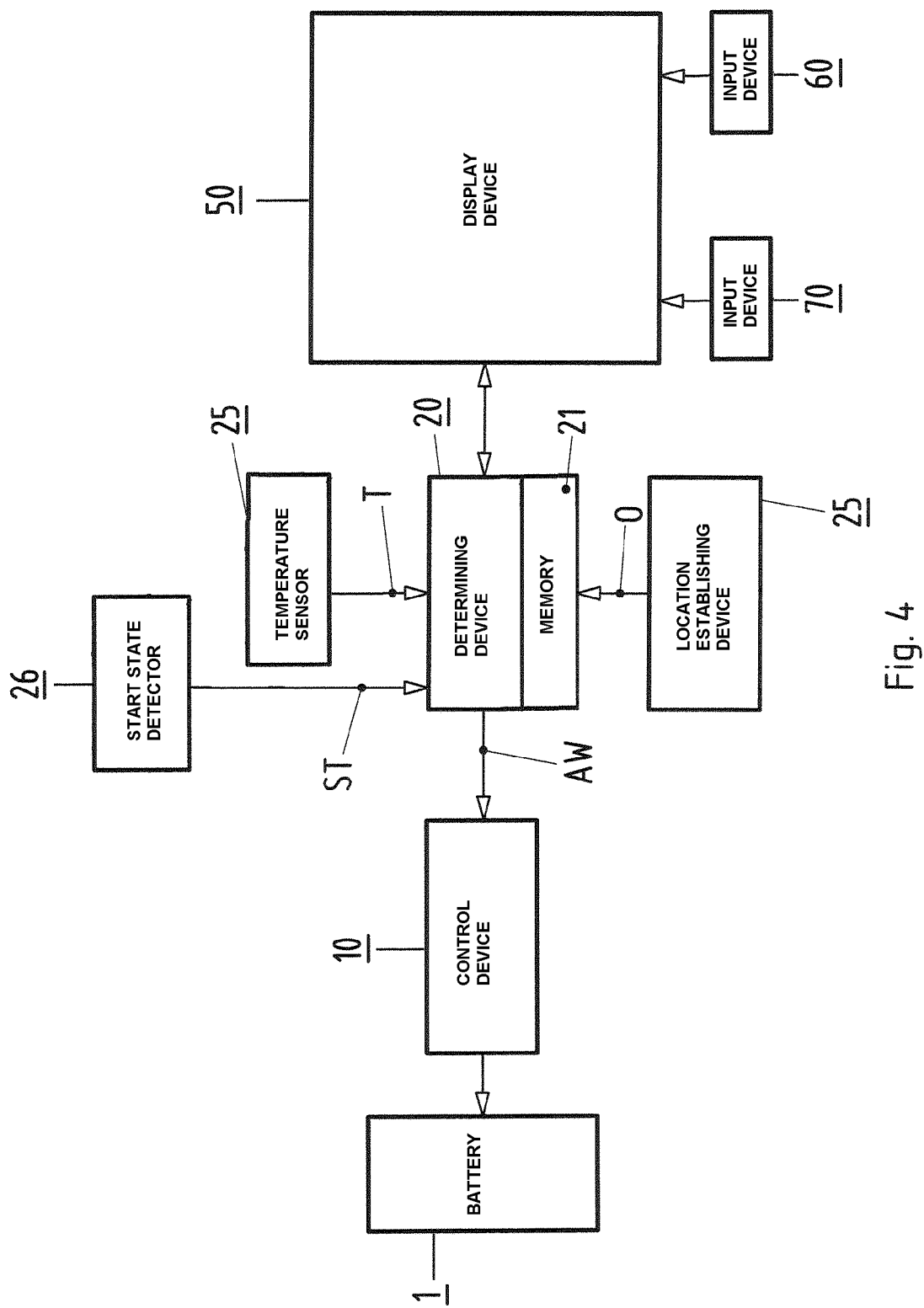
FIG. 4 is a schematic illustration of a second embodiment of the device of the invention for controlling a battery pulse heating mode of a traction battery of a hybrid vehicle.
Figure 5:
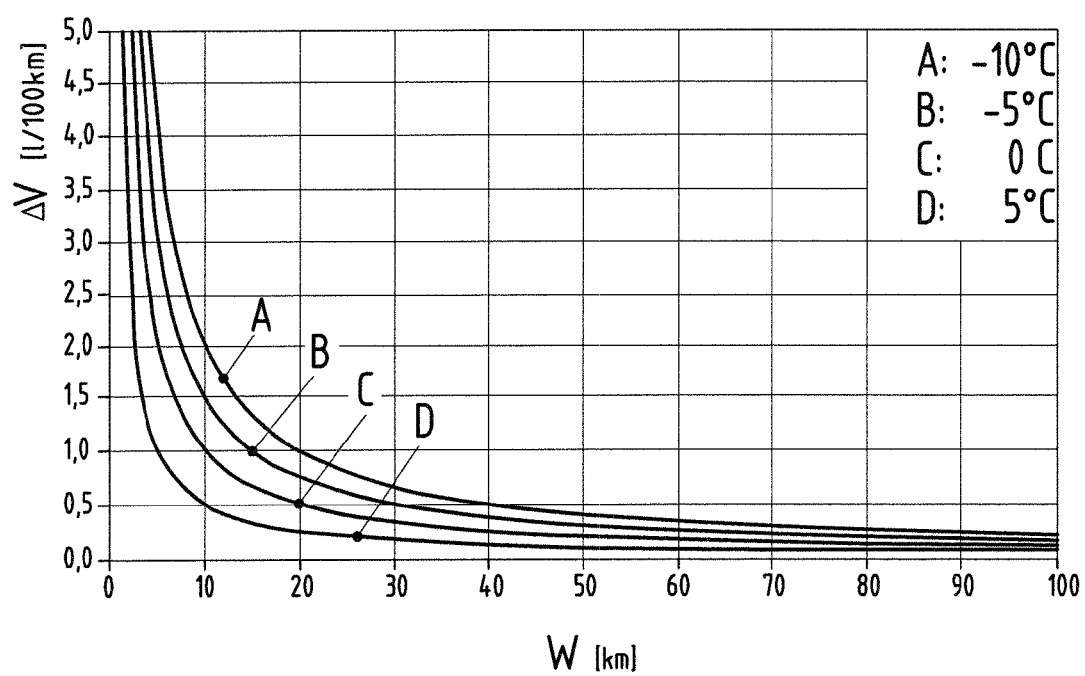
FIG. 5 is an exemplary illustration of dependencies of the additional consumption AV during a battery pulse heating mode on the distance W travelled for different traction battery temperatures T=−10, −5, 0, +5° C.

FIG. 4 is a schematic illustration of a second embodiment of a device for controlling a battery pulse heating mode of a traction battery of a hybrid vehicle.

In the embodiment of FIG. 4, the determining device 20 additionally is connected to a location establishing device 25, for example a navigation system, that transmits a present location O of the hybrid vehicle to the determining device 20.

The determining device 20 initiates a preselection of the dependencies to be determined and/or displayed on the basis of the determined location O.

For example, if it is determined that the present location O of the hybrid vehicle is a great distance from a motorway, for example more than 20 km, then the determining device 20 makes a preselection that the corresponding dependency for the motorway, that is to say curve AB in FIG. 2, is not determined or is determined and not displayed.

This increases clarity for the driver on the display device 50, because an irrelevant curve is omitted.

The mode of operation of the second embodiment is otherwise identical to the mode of operation, explained above with respect to FIG. 1.

Even though the present invention has been described on the basis of preferred exemplary embodiments, it is not restricted to these.

In particular, the embodiments illustrated above may be modified in such a way that the dependencies together with the selection function are displayed only if the temperature of the traction battery lies below a certain minimum temperature, for example below 15° C. That is to say, it can otherwise be assumed that a battery pulse heating mode is not actually required.

It is also possible for additional criteria, such as for example start time, weekday, etc. to be taken into consideration for deciding which dependencies should be displayed on the display device 50 and/or which dependencies should be determined at all by the determining device 20.

In this respect, the device according to the invention may have a learning function which registers that, in the case of a start time of 7 o'clock in the morning, for example, only the curve SV for city traffic is displayed, since it can be assumed that the driver wishes to travel in city traffic to his place of work without having to use other road types for this purpose.

What is claimed is:

1. A method for controlling a battery pulse heating mode of a traction battery of a hybrid vehicle having an internal combustion engine and an electric machine, comprising:
   starting the hybrid vehicle;
   detecting a traction battery temperature of the hybrid vehicle after starting the hybrid vehicle;
   determining a distance that must be traveled for a battery pulse heating mode to result in reduced fuel consumption for at least one predefined road type at the detected traction battery temperature;
   displaying the determined distance on a display device;
   using an input device to select whether a battery pulse heating mode should be carried out; and
   controlling the battery pulse heating mode as a function of the selection.

2. The method of claim 1, wherein the determining step includes determining travel distances at which the battery pulse heating mode will result in reduced fuel consumption during a battery pulse heating mode on the distance travelled for a plurality of predefined road types at the detected traction battery temperature.

3. The method of claim 2, wherein the displaying step includes displaying all of the determined distances.

4. The method of claim 2, further comprising establishing a location of the hybrid vehicle, and displaying only distances that are available options on the basis of the established location.

5. The method of claim 2, wherein the step of determining the distances for a plurality of road types comprises determining dependencies for at least one of motorway, country road, city street.

6. A device for controlling a battery pulse heating mode of a traction battery of a hybrid vehicle that has an internal combustion engine and an electric machine, comprising:
   a temperature detector for detecting a traction battery temperature of the hybrid vehicle after the hybrid vehicle has been started;
   a start state detector for detecting a start state of the hybrid vehicle;
   a determining device for determining a distance that must be traveled for a battery pulse heating mode to result in reduced fuel consumption of the internal combustion engine for at least one predefined road type at the detected traction battery temperature;
   a display device for displaying the determined distance;
   an input device for selecting whether the battery pulse heating mode should be carried out; and
   a control device for controlling the battery pulse heating mode as a function of a control signal that can be generated on the basis of an input at the input device.

7. The device of claim 6, wherein the determining device is configured for determining distances at which the battery pulse heating mode will result in reduced fuel consumption for a plurality of predefined road types at the detected traction battery temperature.

8. The device of claim 7, further comprising a location establishing device for establishing a location of the hybrid vehicle, and the determining device being configured to determine and display only the distances preselected on the basis of the established location.

9. The device of claim 7, wherein determining device determines the road type as one of a motorway, a country road or a city street.

10. The device of claim 6, further comprising a second input device for correcting a selection.

* * * * *